(12) United States Patent
Taniguchi et al.

(10) Patent No.: US 11,993,538 B2
(45) Date of Patent: May 28, 2024

(54) OPAQUE QUARTZ GLASS AND A METHOD FOR PRODUCING THE SAME

(71) Applicant: Tosoh Quartz Corporation, Yamagata (JP)

(72) Inventors: Takashi Taniguchi, Yamagata (JP); Chiemi Ito, Yamagata (JP); Takaya Suzuki, Yamagata (JP); Yuka Oba, Yamagata (JP)

(73) Assignee: TOSOH QUARTZ CORPORATION, Yamagata (JP)

( * ) Notice: Subject to any disclaimer, the term of this patent is extended or adjusted under 35 U.S.C. 154(b) by 0 days.

(21) Appl. No.: 18/262,842

(22) PCT Filed: Jan. 30, 2021

(86) PCT No.: PCT/JP2021/003437
§ 371 (c)(1),
(2) Date: Jul. 25, 2023

(87) PCT Pub. No.: WO2022/162923
PCT Pub. Date: Aug. 4, 2022

(65) Prior Publication Data
US 2024/0083803 A1   Mar. 14, 2024

(51) Int. Cl.
*C03C 3/06* (2006.01)
*C03B 19/06* (2006.01)
*C03C 4/02* (2006.01)

(52) U.S. Cl.
CPC .............. *C03C 3/06* (2013.01); *C03B 19/063* (2013.01); *C03B 19/066* (2013.01); *C03C 4/02* (2013.01); *C03C 2201/02* (2013.01); *C03C 2204/04* (2013.01)

(58) Field of Classification Search
CPC .. C03C 3/06; C03C 4/005; C03C 4/02; C03C 2201/02; C03C 2204/04; C03B 19/063; C03B 19/066
See application file for complete search history.

(56) References Cited

U.S. PATENT DOCUMENTS

| | | | |
|---|---|---|---|
| 5,674,792 A | 10/1997 | Moritz et al. | |
| 10,843,954 B2 | 11/2020 | Sato et al. | |
| 11,339,076 B2 | 5/2022 | Otter et al. | |
| 2013/0085056 A1 | 4/2013 | Kreuzberger | |
| 2021/0039978 A1 | 2/2021 | Kuniyoshi et al. | |
| 2021/0403374 A1 | 12/2021 | Ito et al. | |
| 2022/0250962 A1 | 8/2022 | Ito et al. | |

FOREIGN PATENT DOCUMENTS

| | | | |
|---|---|---|---|
| EP | 816297 A1 * | 1/1998 | ............ C03B 19/09 |
| JP | 3043032 B2 | 3/1992 | |
| JP | 3763420 B2 | 10/1995 | |
| JP | 2019506352 A | 3/2019 | |
| JP | 6666464 B2 | 3/2020 | |
| JP | 6676826 B1 | 4/2020 | |
| JP | 6751822 B1 | 9/2020 | |
| WO | 2008069194 A1 | 6/2008 | |
| WO | 2020121511 A1 | 6/2020 | |
| WO | 2020129174 A1 | 6/2020 | |
| WO | 2020245874 A1 | 12/2020 | |

OTHER PUBLICATIONS

International Search Report with English Translation issued in corresponding International Application No. PCT/JP2021/003437 dated Apr. 13, 2021 (6 pages).
Written Opinion of International Searching Authority issued in corresponding International Application No. PCT/JP2021/003437 dated Apr. 13, 2021 (4 pages).
Chinese Office Action with English translation issued in corresponding Chinese Application No. 202180088653.8 dated Dec. 6, 2023 (14 pages).

* cited by examiner

*Primary Examiner* — Elizabeth A. Bolden
(74) *Attorney, Agent, or Firm* — FLYNN THIEL, P.C.

(57) ABSTRACT

A quartz glass provides an opaque quartz glass having high light-shielding property, excellent mechanical strength and excellent cleaning resistance against hydrofluoric acid. By setting the maximum width of the amorphous bubbles existing in the opaque quartz glass to an average of 3 to 15 μm and the density to 2.15 g/cm$^3$ or more, the mechanical strength after baking and the cleaning resistance by hydrofluoric acid are improved. The opaque quartz glass has a whiteness at a thickness of 10 mm of 75 to 90%, the reflectance of light with a wavelength of 0.24 to 2.6 μm at a thickness of 4 mm is 60 to 85%, and the bending strength after baking is 95 MPa. In addition, a foaming agent may be mixed in the opaque quartz glass. An opaque quartz glass having cleaning resistance against acid can be obtained.

5 Claims, No Drawings

OPAQUE QUARTZ GLASS AND A METHOD FOR PRODUCING THE SAME

TECHNICAL FIELD

The present invention relates to an opaque quartz glass having high heat ray blocking property and light blocking property and a method for producing the same. More specifically, the present invention relates to an opaque quartz glass ingot which can be preferably applied to a member of a semiconductor manufacturing apparatus, a component for an optical instrument, or the like, and also a manufacturing method thereof.

BACKGROUND TECHNOLOGY

Quartz glass has been used for various purposes such as lighting equipment, optical equipment parts, semiconductor industrial parts, and physics and chemistry equipment because it has excellent translucency, heat resistance, and chemical resistance. Among them, opaque quartz glass containing air bubbles in quartz glass has been used as flange members and core tubes of semiconductor heat treatment equipment because of its excellent heat ray blocking property. In addition, since it has excellent light-shielding properties, it is also used as an optical device component such as a reflector base material for a light source lamp of a projector.

In general, opaque quartz glass is classified into two types depending on the manufacturing methods. One is a type which contains spherical bubbles therein and the other type that contains amorphous bubbles therein.

As a method for producing opaque quartz glass containing spherical bubbles therein, a method in which a foaming agent such as silicon nitride is added to crystalline silica or amorphous silica by dry mixing and melted by an acid hydrogen flame (for example, disclosed in Patent Documents 1 to 3) and the like are known.

The opaque quartz glass manufactured by this manufacturing method, bubbles existing inside the opaque quartz glass cannot be dispersed uniformly, and the agglomerated foaming agent vaporizes to form bubbles, so that the bubbles tend to become rather large in size and the mechanical strength of the bubbles and light reflectance will be low.

As a method for producing opaque quartz glass containing amorphous (non sphere) bubbles inside, a molded body of amorphous silica powder is heated at a temperature equal to or lower than its melting temperature, and the heat treatment is interrupted before it is completely densified. A method of partially sintering (see, for example, patent documents 4 and 5 has been proposed).

The opaque quartz glass manufactured according to above described methods can reduce the average diameter of the amorphous bubbles and it is easy for controlling the number of bubbles. Therefore, the opaque quartz glass containing spherical bubbles can be used.

Compared to this, it is an excellent manufacturing method which provides higher mechanical strength and higher light reflectance.

PRIOR ART DOCUMENT

Patent Document

[Patent Document 1] Japanese Patent No. 3043032
[Patent Document 2] Japanese Patent No. 6666464
[Patent Document 3] Japanese Patent No. 6676826
[Patent Document 4] Japanese Patent No. 3763420
[Patent Document 5] Japanese Patent No. 6751822

DISCLOSURE OF THE INVENTION

Problems to be Solved by the Invention

An opaque quartz glass having spherical bubbles therein, the added foaming agents for generating bubbles are not uniformly mixed with the silica powder and aggregated foaming agents vaporizes to form bubbles which cause to form comparatively bigger sized bubbles therein and the mechanical strength and light reflectance ability of the obtained opaque quartz glass tend to be low.

In addition, open bubbles tends to be generated on the surface thereof and even if the surface is baked for obtaining smooth finished surface, the baked surface of the product tends to have a rough finish.

And in case the obtained opaque quartz glass is applied as a flange member, the tightness between the flange and the device is not preferable and tends to cause troubles such as leaking from the contact surfaces of the flanges.

Further, since the surface contact area of the quartz glass is rough and rather large in area, there might be a big problem that an amount of etching becomes rather large during the cleaning process with hydrofluoric acid, and after cleaning the surface of the quartz glass, the surface tends to be more uneven or rough which might be more troublesome.

In case of opaque quartz glass having amorphous bubbles therein, it might be possible to reduce the average diameter of the amorphous bubbles, but depending on the size and numbers of the amorphous bubbles, the type of opaque quartz glass containing spherical bubbles inside is opaque. Similar to quartz glass, the reflectance and mechanical strength of light may decrease, and the amount of etching in cleaning with hydrofluoric acid may increase.

In addition, the surface of any type of opaque quartz glass, whether it is a type containing spherical bubbles inside or a type containing amorphous bubbles therein, when the quartz glass is baked, the bubbles exiting inside expand and get together and become larger size and consequently the reflectance value of the quartz glass may become low.

It may be associated near the surface, depending on the baking conditions. The bubbles may become large and the light reflectance may become lower than that before the baking finished.

In order to maintain the reflectance value of the opaque quartz glass high, there might be a number of the reflectance value is raised preliminary after has finished, there is a method of increasing the number of spherical or amorphous bubbles inside as a means to further increase the reflectance of opaque quartz glass before baking finish. In that case, there is a problem that the density, the mechanical strength, and the etching amount in cleaning with hydrofluoric acid tend to increase due to the increase in the number of bubbles.

An objective of the present invention is to provide an opaque quartz glass having high light shielding property, high mechanical strength and excellent cleaning resistance by hydrofluoric acid and a method for producing the same.

Means for Solving Problems

An opaque quartz glass composed solely of amorphous bubbles, characterized in that the average maximum width of the amorphous bubbles is 3 to 15 μm, the density is 2.15 g/cm$^3$ or more, the whiteness at a thickness of 10 mm is from 75 to 90%, the reflectance of light of a wavelength of 0.24 to 2.6 μm at 4 mm thick is 60 to 85% and the bending strength is 80 MPa or more.

The average maximum width of the amorphous bubbles is an average value obtained by cutting a sample, observing 20 or more shapes of the amorphous cells exposed on the cut surface with a scanning electron microscope and measuring the maximum widths thereof.

Further, it is an opaque quartz glass having a baked surface and consisting only of amorphous cells, in which the average maximum width of the amorphous cells is 3 to 15 μm, the density is 2.15 g/cm$^3$ or more, and the thickness is 10 mm. It is an opaque quartz glass characterized by having a whiteness of 75 to 90%, a reflectance of light having a wavelength of 0.24 to 2.6 μm at a thickness of 4 mm of 60 to 85%, and a bending strength of 95 MPa or more.

The average value of the maximum widths of the amorphous cells is an average value obtained by cutting a sample, observing 20 or more shapes of the amorphous cells exposed on the cut surface with a scanning electron microscope and measuring the maximum widths thereof.

Further, it is an opaque quartz glass having a baked finished surface and composed of amorphous cells and spherical cells, in which the average maximum width of the amorphous cells is 3 to 15 μm, the density is 2.15 g/cm$^3$ or more and the thickness is 10 mm. It is an opaque quartz glass characterized by having a whiteness of 75 to 90%, a reflectance of light having a wavelength of 0.24 to 2.6 μm at a thickness of 4 mm of 60 to 85%, and a bending strength of 95 MPa or more.

The average value of the maximum widths of the amorphous cells is an average obtained by cutting a sample, observing 20 or more shapes of the amorphous cells on the cut surface with a scanning electron microscope and measuring the maximum widths thereof.

By mixing fine powder of silicon carbide as a foaming agent into opaque quartz glass consisting only of amorphous bubbles, spherical bubbles are generated near the surface by baking finish, so that the amorphous bubbles and the spherical bubbles coexist at the same time.

In order to contain spherical bubbles in quartz glass before baking finish, a method of producing opaque quartz glass by melting with a hydrogen acid flame is used, but in that case, it is mixed inside as a foaming agent.

Since the fine powder of silicon carbide foams at the time of melting and the fine powder of silicon carbide does not exist inside after melting at all.

Therefore, the effect of foaming or foaming phenomena do not occur at the time of baking is conducted.

In the opaque quartz glass of the present invention only amorphous bubbles are present in the glass before baking finish, and the average maximum width of the amorphous bubbles is 3 to 15 μm. When the average diameter of the amorphous bubbles is smaller than 3 μm, high whiteness and reflectance can be obtained, but the surface roughness becomes large due to the association of a large amount of bubbles contained in the glass during baking finish. This is not preferable because it tends to reduce the mechanical strength and increase the etching amount in cleaning with hydrofluoric acid. When the average diameter of the amorphous bubbles is larger than 15 μm, it tends to lead to a decrease in density, and it is difficult to set the density to 2.15 g/cm$^3$ or more.

The average of the maximum widths of the amorphous cells is an average value obtained by cutting a sample, observing 20 or more shapes of the amorphous cells on the cut surface with a scanning electron microscope, and measuring the maximum widths thereof.

The opaque quartz glass of the present invention has a density of 2.15 g/cm$^3$ or more. If the number of amorphous bubbles is large and the density is less than 2.15 g/cm$^3$ in the state before baking finish, the mechanical strength tends to decrease and a value of bending strength of 80 MPa or more cannot be obtained.

Further, when the number of amorphous bubbles and spherical bubbles is large and the density is less than 2.15 g/cm$^3$ in the state after baking finish, the mechanical strength is also likely to decrease, and a value of bending strength of 95 MPa or more is obtained.

The opaque quartz glass of the present invention has a whiteness of 75 to 90% at a thickness of 10 mm and a reflectance of light having a wavelength of 0.24 to 2.6 μm at a thickness of 4 mm of 60 to 85%.

By controlling the average diameter and density of the amorphous bubbles within the above range, the whiteness and reflectance in the above range can be obtained. If the average diameter of the amorphous cells is large, it leads to a decrease in density, and if the average diameter of the amorphous cells is small, the whiteness and reflectance in the above range cannot be obtained. Even if the average diameter of the amorphous bubbles is 3 to 15 μm, if the density is less than 2.15 g/cm$^3$, the whiteness and reflectance in the above range cannot be obtained because many amorphous bubbles are present.

The opaque quartz glass of the present invention has a bending strength of 80 MPa or more before baking finish and a bending strength of 95 MPa or more after baking finish. If the bending strength is less than 80 MPa, cracks and chips are likely to occur during processing of the opaque quartz glass product, and there is a high risk of damage when used for a flange or a core tube of a semiconductor manufacturing apparatus.

By performing the baking finish, the bending strength becomes 95 MPa or more, so that the risk of breakage or the like can be further reduced.

The method for producing the opaque quartz glass of the present invention will be described below.

In the method for producing opaque quartz glass of the present invention, silica powder is dispersed in water at 45 to 75 wt % to form a slurry, the average particle size of the pulverized silica powder is 3 to 9 μm, and the solid BET contained in the slurry. After wet pulverization by one or a combination of two or more methods of bead mill pulverization, ball mill pulverization, vibration mill pulverization, and attritor pulverization so that the specific surface area becomes 2 to 9 m$^2$/g, the slurry is spray-dried and granulated to be substantially. Granulated powder having a spherical shape, an average particle size of 30 to 150 μm, and a water content of 2 wt % or less is obtained and the granulated powder is press-molded and fired.

Hereinafter, each step will be described in detail. As can be said for all the processes, it is necessary to carefully select the equipment to be used so that impurity contamination will be avoided during the process.

(1) Selection of Raw Material Powder

The production method of the silica powder is not particularly limited, and for example, an amorphous silica powder produced by hydrolyzing silicon alkoxide, a silica powder produced by hydrolyzing silicon tetrachloride with a hydrogen acid flame or the like is used. Can be done. In addition, powder of crushed natural quartz or fumed silica can also be used.

The average particle size of the silica powder is preferably 300 μm or less. If the average particle size exceeds 300 μm, it takes a long time for wet pulverization of the silica powder, which is not preferable because it causes a decrease in productivity and an increase in production cost.

(2) Slurry Adjustment

The concentration of the slurry in which the silica powder is dispersed in water is preferably 45 to 75 wt %, preferably 50 to 70 wt %. If it exceeds 75 wt %, the viscosity of the slurry becomes high and wet pulverization cannot be performed. Further, if the concentration is less than 45 wt %, the amount of water is large and the amount of heat required for drying is large, which is not desirable because it causes a decrease in productivity and an increase in production cost.

(3) Wet Pulverization of Slurry

Using one or more beads selected from silicon carbide beads having an average diameter of 1 mm to 20 mm, quartz glass beads, zirconia beads, and alumina beads, the average particle size of the slurry pulverized powder is 3 to 9 μm, and is contained in the slurry. Wet pulverization is performed so that the BET specific surface area of the solid matter is 2 to 9 $m^2/g$. Wet pulverization is preferably performed so that the BET specific surface area is preferably 4 to 7 $m^2/g$. If the BET specific surface area is smaller than 2 $m^2/g$, the strength of the granulated powder is lowered and easily collapses, and if it is larger than 9 m2/g, the moldability in press molding is deteriorated, which is not preferable. The wet pulverization method of the slurry is not particularly limited, and examples thereof include bead mill pulverization, ball mill pulverization, vibration mill pulverization, and attritor pulverization, and any means may be used.

Here, when adjusting the whiteness and reflectance of the opaque quartz glass by baking finish, silicon carbide beads are used as the pulverizing medium. Fine powder generated by abrasion of silicon carbide beads during crushing is mixed in the slurry, and the silicon carbide fine powder mixed in the slurry remains together with the raw material powder in the subsequent process and is dispersed in the opaque quartz glass. become.

On the other hand, as another method, it is possible to directly add the fine powder of silicon carbide into the slurry therein for mixing the, but since it is difficult to uniformly disperse the fine powder of silicon carbide, the slurry is being wet-ground. It is preferable to mix the fine powder generated from the wear of the silicon carbide beads into the slurry.

The amount of the silicon carbide fine powder mixed can be adjusted by changing the pulverization time using the silicon carbide beads. When the set fine powder of silicon carbide is mixed by crushing the slurry using silicon carbide beads, but the crushing of the raw material powder is insufficient, one type selected from quartz glass beads, zirconia beads, and alumina beads or By adding crushing using a plurality of beads or crushing before crushing using silicon carbide beads, the raw material powder can be crushed without changing the mixing amount of the silicon carbide fine powder.

When it is not necessary to control the whiteness and reflectance by baking finish and the mixture of silicon carbide fine powder is set to 0, the raw material powder is crushed by one or more selected from quartz glass beads, zirconia beads, and alumina beads. It may be carried out using the beads of.

(4) Spray Drying Granulation

Next, the prepared slurry is spray-dried to obtain granulated powder. The obtained granulated powder is substantially spherical, has an average particle size of 30 to 150 μm, and has a water content of 2 wt % or less. If the average particle size is less than 30 μm, the granulated powder dissipates during press molding and the yield deteriorates. When the average particle size exceeds 150 μm, the number of large-diameter amorphous bubbles increases in the fired glass, and the average maximum width of the amorphous bubbles does not become 15 μm or less. In addition, the uniformity of press molding also deteriorates. If the water content exceeds 2 wt %, the fluidity of the granulated powder deteriorates, and the uniformity during press molding deteriorates.

(5) Press Molding and Firing of Granulated Powder

An opaque quartz glass ingot can be obtained by press-molding the obtained granulated powder into an arbitrary shape and firing it. The press pressure is preferably 10 to 300 MPa. If it is less than 10 MPa, the molded product will collapse and the yield at the time of molding will deteriorate. In order to increase the press pressure to more than 300 MPa, a large-scale facility is required, which may lead to a decrease in productivity and an increase in production cost, which is not preferable.

The obtained molded product is fired at a maximum firing temperature of 1350 to 1500° C., preferably 1375 to 1475° C. by combining one or a plurality of types selected from atmospheric firing, vacuum firing, and atmospheric firing. When the firing temperature is high, the whiteness and reflectance decrease, while when the firing temperature is low, the density and mechanical strength decrease.

(6) Machining and Baking Finish

After processing the opaque quartz glass ingot obtained through the above process into a product shape using a processing machine such as a band saw, wire saw, or core drill, baking finish processing is performed for the purpose of suppressing the generation of particles from the processed surface. By processing with an oxyhydrogen flame burner or the like, the surface irregularities generated by machining are smoothed.

When silicon carbide fine powder is mixed in opaque quartz glass, new foaming of silicon carbide fine powder occurs in parallel with the association of existing amorphous bubbles generated near the surface of the ingot during the baking finish process. The whiteness and reflectance can be adjusted by reducing the decrease in the number of bubbles or increasing the number of bubbles.

When the number of bubbles on the surface of the ingot is large, the bending strength and the cleaning resistance by hydrofluoric acid tend to be low.

The whiteness and reflectance, bending strength, and cleaning resistance with hydrofluoric acid are adjusted in consideration of the characteristics required for various uses of opaque quartz glass.

[The Invention's Effect]

Since the opaque quartz glass of the present invention is excellent in heat ray blocking property, light blocking property, mechanical strength, and cleaning resistance by hydrofluoric acid, various core tubes, jigs, and jigs used especially in the field of semiconductor manufacturing. It can be suitably used as a constituent material for containers such as bell jars, for example, a core tube for processing a silicon wafer, a flange portion thereof, a heat insulating fin, and a jig for melting silicon. It can also be used as a reflector base material for a light source lamp for a projector as an optical device component.

BEST MODE FOR CARRYING OUT THE INVENTION

Hereinafter, the present invention will be specifically described based on examples, but the present invention is not limited to the examples.

The desktop scanning electron microscope used to measure the average particle size of bubbles is TM4000Plus manufactured by Hitachi, Ltd.

Example 1

Slurry in which silica powder is dispersed in water at 45 to 75 wt % is crushed. Bead mill crushing and ball mill crushing so that the average particle size of the powder is 3 to 9 μm and the BET specific surface area of the solid contained in the slurry is 2 to 9 m²/g. After wet pulverization using quartz glass beads by one or a combination of one or more methods of vibration mill pulverization and attritor pulverization, spray-dry granulation is performed, and the powder is substantially spherical and has an average particle size of 30 to. As a granulated powder having a water content of 150 μm and a water content of 2 wt % or less, it was press-molded and then fired to obtain opaque quartz glass.

The characteristics of the obtained opaque quartz glass are shown in Table 1. The average maximum width of amorphous cells in opaque quartz glass is 10 μm, the density is 2.18 g/cm³, the whiteness is 87% at a thickness of 10 mm, and the wavelength is 0.24 to 2.6 μm at a thickness of 4 mm. The reflectance of light was 73% and the bending strength was 82 MPa.

After the baking finish, the whiteness at a thickness of 10 mm was 84%, and the reflectance of light at a wavelength of 0.24 to 2.6 μm at a thickness of 4 mm was 67%, which were slightly lower than those before the baking finish. The bending strength after the baking finish was 109 MPa, the surface roughness Ra was 0.04 μm, and the amount of wear after being immersed in a 10% hydrofluoric acid aqueous solution for 7 hours was 0.06 g.

Example 2

Opaque quartz glass was obtained in the same manner as in Example 1.

The characteristics of the obtained opaque quartz glass are shown in Table 1. The average maximum width of amorphous cells in opaque quartz glass is 8 μm, the density is 2.17 g/cm³, the whiteness is 89% at a thickness of 10 mm, and the wavelength is 0.24 to 2.6 μm at a thickness of 4 mm. The reflectance of light was 76% and the bending strength was 84 MPa.

After the baking finish, the whiteness at a thickness of 10 mm was 87%, and the reflectance of light at a wavelength of 0.24 to 2.6 μm at a thickness of 4 mm was 73%, which were slightly lower than those before the baking finish. The bending strength after the baking finish was 112 MPa, the surface roughness Ra was 0.04 μm, and the amount of wear after being immersed in a 10% hydrofluoric acid aqueous solution for 7 hours was 0.06 g.

Example 3

Opaque quartz glass was obtained in the same manner as in Example 1.

The characteristics of the obtained opaque quartz glass are shown in Table 1. The average maximum width of amorphous cells in opaque quartz glass is 4 μm, the density is 2.19 g/cm³, the whiteness is 90% at a thickness of 10 mm, and the wavelength is 0.24 to 2.6 μm at a thickness of 4 mm. The reflectance of light was 78% and the bending strength was 85 MPa.

After the baking finish, the whiteness at a thickness of 10 mm was 88%, and the reflectance of light at a wavelength of 0.24 to 2.6 μm at a thickness of 4 mm was 74%, which were slightly lower than those before the baking finish. The bending strength after the baking finish was 110 MPa, the surface roughness Ra was 0.1 μm, and the amount of wear after being immersed in a 10% hydrofluoric acid aqueous solution for 7 hours was 0.10 g.

Example 4

In the same manner as in Example 1, half of the wet crushing time was crushed using silicon carbide beads, and the other half was crushed using quartz glass beads to prepare opaque quartz glass. The characteristics of the obtained opaque quartz glass are shown in Table 1. The average maximum width of amorphous cells in opaque quartz glass is 7 μm, the density is 2.17 g/cm³, the whiteness is 89% at a thickness of 10 mm, and the wavelength is 0.24 to 2.6 μm at a thickness of 4 mm. The reflectance of light was 76% and the bending strength was 81 MPa, which was equivalent to that of Example 2.

The whiteness at a thickness of 10 mm after baking is 89%, and the reflectance of light with a wavelength of 0.24 to 2.6 μm at a thickness of 4 mm is 77%, which is higher than that of Example 2 even after baking. It showed whiteness and reflectance. The bending strength after the baking finish was 102 MPa, the surface roughness Ra was 0.3 μm, and the amount of wear after being immersed in a 10% hydrofluoric acid aqueous solution for 7 hours was 0.14 g, which was compared with Example 2, Bending strength and hydrofluoric acid resistance were low values.

Example 5

Table 1 shows the characteristics of the opaque quartz glass obtained by pulverizing using silicon carbide beads in the same manner as in Example 1. The average maximum width of amorphous cells in opaque quartz glass is 8 μm, the density is 2.17 g/cm³, the whiteness is 89% at a thickness of 10 mm, and the wavelength is 0.24 to 2.6 μm at a thickness of 4 mm. The reflectance of light was 76% and the bending strength was 83 MPa, which were equivalent to those of Examples 2 and 4.

After the baking finish, the whiteness at a thickness of 10 mm is 90%, and the reflectance of light at a wavelength of 0.24 to 2.6 μm at a thickness of 4 mm is 80%, which is higher than that of Examples 2 and 4 after baking. Also showed high whiteness and reflectance. The bending strength after the baking finish was 95 MPa, the surface roughness Ra was 0.4 μm, and the amount of wear after being immersed in a 10% hydrofluoric acid aqueous solution for 7 hours was 0.17 g. Bending strength and hydrofluoric acid resistance were low values.

Comparative Example 1

Opaque quartz glass was prepared by pulverizing using quartz glass beads for obtaining pulverized quartz glass powder having the average particle size of 2 μm in the same manner as in the Example 1.

The characteristics of the obtained opaque quartz glass are shown in Table 1.

The average maximum width of amorphous cells in opaque quartz glass is 0.8 μm, the density is 2.16 g/cm³, the whiteness at a thickness of 10 mm is 93%, and the wavelength at a thickness of 4 mm is 0.24 to 2. The reflectance of light of 6 μm was 88%, which was higher than that of the examples. The bending strength was 85 MPa.

After the baking of the finished opaque quartz glass, the whiteness of a thickness of 10 mm was 92%, and the reflectance of light at a wavelength of 0.24 to 2.6 µm at a thickness of 4 mm was 86%, which were higher than those of the examples. The bending strength is 93 MPa, the surface roughness Ra is 0.4 µm, and the amount of wear after immersion in a 10% hydrofluoric acid aqueous solution for 7 hours is 0.21 g, which is lower in mechanical strength than in the examples. The amount of wear due to hydrofluoric acid immersion is large.

Comparative Example 2

An opaque quartz glass was manufactured by using spray-drying granulation method and the average particle size was 170 µm in the same manner as in Example 1 is obtained. The characteristics of the obtained opaque quartz glass are shown in Table 1.

The average maximum width of the amorphous bubbles in the opaque quartz glass was 19 µm, and the densities were 2.14 g/cm$^3$ and did not exceed 2.15 g/cm$^3$. The whiteness at a thickness of 10 mm was 85%, and the reflectance of light at a wavelength of 0.24 to 2.6 µm at a thickness of 4 mm was 68%. The bending strength was 77 MPa, which was lower than that of the examples.

After the baking, the whiteness at a thickness of 10 mm was 84%, and the reflectance of light with a wavelength of 0.24 to 2.6 µm at a thickness of 4 mm was 66%, which were slightly lower than those before the baking finish. The bending strength is 89 MPa, the surface roughness Ra is 0.7 µm, and the amount of wear after immersion in a 10% hydrofluoric acid aqueous solution for 7 hours is 0.20 g, which is lower in mechanical strength than in the examples. The amount of wear due to hydrofluoric acid immersion is large.

Comparative Example 3

In the same manner as in Example 1, firing was performed so that the firing temperature was 1340° C. to prepare opaque quartz glass.

The characteristics of the obtained opaque quartz glass are shown in Table 1.

The average maximum width of the amorphous bubbles in the opaque quartz glass was 14 µm, and the densities were 2.12 g/cm$^3$ and did not exceed 2.15 g/cm$^3$. The whiteness at a thickness of 10 mm was 94%, and the reflectance of light at a wavelength of 0.24 to 2.6 µm at a thickness of 4 mm was 87%, which were higher than those of the examples, but the bending strength was 72 MPa. The value was lower than that of the examples.

After the baking finish, the whiteness at a thickness of 10 mm was 91%, and the reflectance of light with a wavelength of 0.24 to 2.6 µm at a thickness of 4 mm was 79%, which was slightly lower than that before the baking finish. The mechanical strength is 85 MPa, the surface roughness Ra is 0.8 µm, and the amount of wear after immersion in a 10% hydrofluoric acid aqueous solution for 7 hours is 0.22 g, which is lower in mechanical strength than in Examples and hydrogen fluoride. The amount of wear due to acid immersion is large.

Comparative Example 4

In the same manner as in Example 1, pulverization was performed using silicon carbide beads and firing was performed at the firing temperature of 1340° C. for preparing opaque quartz glass.

The characteristics of the obtained opaque quartz glass are shown in Table 1. The average maximum width of the amorphous bubbles in the opaque quartz glass was 13 µm and the density was 2.12 g/cm$^3$ and do not exceed 2.15 g/cm$^3$.

The whiteness at a thickness of 10 mm was 93% and the reflectance of light at wavelength of 0.24 to 2.6 µm at a thickness of 4 mm was 86%, which were higher than those of the examples but the bending strength was 73 MPa which was lower than that of the examples.

After the baking, the whiteness at a thickness of 10 mm is 94%, and the reflectance of light with a wavelength of 0.24 to 2.6 µm at a thickness of 4 mm is 87%, which are extremely high values was observed compared with the examples. The bending strength is 72 MPa, the surface roughness Ra is 1.1 µm and the amount of wear after immersion in a 10% hydrofluoric acid aqueous solution for 7 hours is 0.28 g, which is lower in mechanical strength than in the examples. The amount of wear due to hydrofluoric acid immersion is observed to be rather large.

TABLE 1

| | | | Before Burning | | | | After Burning | | | | Wearness hydrofluoric acid immersion (g) |
|---|---|---|---|---|---|---|---|---|---|---|---|
| | | | Mean Diameter (µm) | Bending Strength (MPa) | Whitness (%) | Reflectivity (%) | Bending Strength (MPa) | Whitness (%) | Reflectivity (%) | Bending Strength (MPa) | Ra (µm) | |
| Example 1 | SiO$_2$ | SiO$_2$ | 10 | 2.18 | 87 | 73 | 82 | 84 | 67 | 109 | 0.04 | 0.06 |
| Example 2 | SiO$_2$ | SiO$_2$ | 8 | 2.17 | 89 | 76 | 84 | 87 | 73 | 112 | 0.04 | 0.06 |
| Example 3 | SiO$_2$ | SiO$_2$ | 4 | 2.19 | 90 | 78 | 85 | 88 | 74 | 110 | 0.1 | 0.10 |
| Example 4 | SiC | SiO$_2$ | 7 | 2.17 | 89 | 76 | 81 | 89 | 77 | 102 | 0.3 | 0.14 |
| Example 5 | SiC | SiC | 8 | 2.17 | 89 | 76 | 83 | 90 | 80 | 95 | 0.4 | 0.17 |
| Comparative Example 1 | SiO$_2$ | SiO$_2$ | 0.8 | 2.16 | 93 | 88 | 85 | 92 | 86 | 93 | 0.4 | 0.21 |
| Comparative Example 2 | SiO$_2$ | SiO$_2$ | 19 | 2.14 | 85 | 68 | 77 | 84 | 66 | 89 | 0.7 | 0.20 |
| Comparative Example 3 | SiO$_2$ | SiO$_2$ | 14 | 2.12 | 94 | 87 | 72 | 91 | 79 | 85 | 0.8 | 0.22 |
| Comparative Example 4 | SiC | SiC | 13 | 2.12 | 93 | 86 | 73 | 94 | 87 | 72 | 1.1 | 0.28 |

An opaque quartz glass of the present invention having high light-shielding property, high mechanical strength and excellent cleaning resistance against hydrofluoric acid and is well applicable for members of the semiconductor manufacturing equipment parts for optical equipment and or the like.

Further, by controlling the ratio of the amorphous bubbles and the spherical bubbles, it becomes possible to control or to adjust the whiteness, the reflectance or the bending strength of the product depending on the usage of the products.

The invention claimed is:

1. An opaque quartz glass consisting of amorphous cells, an average maximum width of the amorphous cells being 3 to 15 μm, the opaque quartz glass having a density of 2.15 g/cm$^3$ or more, a whiteness at a 10-mm thickness of 75 to 90%, a reflectance of light having a wavelength of 0.24 to 2.6 μm at a 4-mm thickness of 60 to 85%, and a bending strength of 80 MPa or more, wherein the average of the maximum width of the amorphous cells is the average value of the maximum width of the amorphous cells observed and measured by 20 or more amorphous bubbles appearing on a cut surface of a sample with a cross-sectional scanning electron microscope.

2. The opaque quartz glass according to claim 1, wherein the opaque quartz glass has a baked surface, and the opaque quartz has a bending strength of 95 MPa or more.

3. An opaque quartz glass having a baked surface and being comprised of amorphous cells and spherical cells, the amorphous cells having an average maximum width of 3 to 15 μm, wherein the opaque quartz glass has a density of 2.15 g/cm$^3$ or more, a whiteness of 75 to 90% at a 10-mm thickness, a reflectance of light having a wavelength of 0.24 to 2.6 μm at a 4-mm thickness of 60 to 85%, and a bending strength of 95 MPa or more, wherein the average of the maximum width of the amorphous cells is the average value of the maximum width of the amorphous cells observed and measured by 20 or more amorphous bubbles appearing on a cut surface of a sample with a cross-sectional scanning electron microscope.

4. A method of manufacturing an opaque quartz glass comprising the steps of:

preparing a silica powder slurry having a silica powder concentration of 45-75 wt %;

subjecting the slurry to wet pulverization to form a silica powder having an average particle size of 3 to 9 μm and a BET specific surface area of the solid contained in the slurry being 2 to 9 m$^2$/g after pulverization by applying one or a combination of methods selected from beads mill pulverization, ball mill pulverization, vibration mill pulverization, and attritor pulverization;

subjecting the slurry to spray dry granulation to form substantially spherical granulated powder having a mean particle diameter of 30 to 150 μm and a water content of 2 wt % or less; and press molding the granulated powder to create a press molded powder, and firing the press molded powder at a temperature between 1350° and 1500° C.

5. The method of manufacturing of claim 4, wherein silicon carbide beads are used as a pulverizing medium during the step of subjecting the slurry to wet pulverization, silicon carbide fine powder is used as a foaming agent by addition to the silica powder, and heat is generated by a baking finish process to generate spherical bubbles in a region close to a surface.

* * * * *